(12) United States Patent
Farley et al.

(10) Patent No.: US 10,111,386 B2
(45) Date of Patent: Oct. 30, 2018

(54) HARVESTER DELIVERY CONTROL SYSTEM

(75) Inventors: Herbert M. Farley, Elizabethtown, PA (US); Curtis F. Hillen, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 569 days.

(21) Appl. No.: 13/342,597

(22) Filed: Jan. 3, 2012

(65) Prior Publication Data
US 2013/0172057 A1    Jul. 4, 2013

(51) Int. Cl.
*A01D 75/28* (2006.01)

(52) U.S. Cl.
CPC .................. *A01D 75/282* (2013.01)

(58) Field of Classification Search
CPC .................... A01D 41/1276; A01D 75/282
USPC .... 460/5, 8, 1, 79, 85, 90–93, 97, 101, 102, 460/149, 901–903
See application file for complete search history.

(56) References Cited

U.S. PATENT DOCUMENTS

| | | | |
|---|---|---|---|
| 3,581,746 A | | 6/1971 | Louks |
| 3,593,719 A | * | 7/1971 | Ashton et al. ............ 460/73 |
| 3,613,691 A | * | 10/1971 | Wilshusen .................. 460/75 |
| 3,827,442 A | | 8/1974 | Scholz |
| 4,259,829 A | | 4/1981 | Strubbe |
| 4,337,611 A | | 7/1982 | Mailander et al. |
| 4,344,443 A | | 8/1982 | De Busscher et al. |
| 4,466,230 A | | 8/1984 | Osselaere et al. |
| 4,475,561 A | | 10/1984 | Decoene et al. |
| 4,557,276 A | * | 12/1985 | Hyman et al. ............... 460/9 |
| 4,863,415 A | * | 9/1989 | Carnewal et al. ........... 460/101 |
| 4,875,889 A | | 10/1989 | Hagerer et al. |
| 5,282,771 A | * | 2/1994 | Underwood ............... 460/8 |
| 5,338,257 A | | 4/1994 | Underwood |
| 6,083,103 A | | 7/2000 | Posselius et al. |
| 6,579,172 B2 | * | 6/2003 | Lauer ..................... 460/101 |
| 6,591,145 B1 | | 7/2003 | Hoskinson et al. |
| 6,592,453 B2 | | 7/2003 | Coers et al. |
| 6,666,007 B2 | | 12/2003 | Schroeder |

(Continued)

FOREIGN PATENT DOCUMENTS

DE    2454315 A1    5/1976

*Primary Examiner* — Thomas B Will
*Assistant Examiner* — Mai T Nguyen
(74) *Attorney, Agent, or Firm* — Patrick M. Sheldrake; Peter K. Zacharias (57) ABSTRACT

An apparatus and method for distributing crop material onto a cleaning sieve of an agricultural combine. The method includes providing a sensor in connection with a controller, the sensor senses information representative of grain associated with a crop material distributor and an inclination angle associated with the crop material distributor, and outputs signals representative of grain associated with a crop material distributor and an inclination angle associated with the crop material distributor to the controller. The method provides the crop material distributor for distributing crop material from a threshing system onto a sieve. The controller determines information representative of grain associated with a crop material distributor and an inclination angle associated with at least one of the crop material distributor and the combine. The method includes outputting signals for operable control of operating parameters associated with the crop material distributor and the sieve.

14 Claims, 4 Drawing Sheets

(56) References Cited

U.S. PATENT DOCUMENTS

| | | | |
|---|---|---|---|
| 6,672,957 B2* | 1/2004 | Voss et al. | 460/101 |
| 7,430,845 B2 | 10/2008 | Kormann et al. | |
| 7,553,226 B2* | 6/2009 | Dhont et al. | 460/101 |
| 7,645,190 B2 | 1/2010 | Schwinn et al. | |
| 8,282,453 B1* | 10/2012 | Hillen et al. | 460/13 |
| 2002/0128054 A1* | 9/2002 | Lauer | 460/101 |
| 2003/0066277 A1* | 4/2003 | Behnke | A01D 41/127 56/10.2 R |
| 2005/0241285 A1* | 11/2005 | Maertens | A01D 41/12 56/1 |
| 2006/0229119 A1 | 10/2006 | Wamhof et al. | |
| 2009/0048744 A1 | 2/2009 | Ricketts et al. | |
| 2009/0325658 A1 | 12/2009 | Phelan et al. | |
| 2010/0115906 A1* | 5/2010 | Tilly | A01B 73/00 56/228 |
| 2012/0047861 A1* | 3/2012 | Murray et al. | 56/10.2 R |

\* cited by examiner

HARVESTER DELIVERY CONTROL SYSTEM

FIELD OF THE INVENTION

The present invention relates generally to a delivery control system for a harvester, and more particularly, to a delivery control system for a harvester, such as an agricultural combine for evening the distribution of threshed crops being delivered from the threshing system to the cleaning system of a combine, including when the receiving component of the cleaning system is tilted to accommodate uneven terrain, such as uphill or downhill travel by the combine.

BACKGROUND OF THE INVENTION

Combines are used all over the world to harvest many different crops. A typical combine configuration utilizes a separation or threshing system including one or more rotors partially or fully surrounded by a perforated concave, wherein threshed crop material will fall through the perforations of the concave enroute to a cleaning system operable for separating grain of the threshed crop material from material other than grain (MOG). Often, due to the combine encountering uneven terrain, such as encountered during uphill and downhill travel, the rate of delivery of this threshed crop material from the separating system to the cleaning system can widely fluctuate. For example, the rate of delivered or discharged crop material can be temporarily reduced or interrupted during downhill travel, with an opposite effect occurring during uphill travel. A significant problem that can result from uneven distribution of crop material to the cleaning system is increased grain loss resulting from overloading of regions of the cleaning system sieve or sieves.

In light of the capabilities and limitations of the apparatus discussed above for distributing crop material delivery to a cleaning system of a combine, what is sought is a system and method which accommodates uneven terrain, particularly uphill and downhill travel conditions.

SUMMARY OF THE INVENTION

Other features and advantages of the present invention will be apparent from the following more detailed description of the preferred embodiment, taken in conjunction with the accompanying drawings which illustrate, by way of example, the principles of the invention.

The present invention relates to a system for distributing crop material on a cleaning sieve of an agricultural combine, including a threshing system. A sieve is positioned and configured for receiving crop material containing grain from the threshing system and allows the grain and smaller elements of the crop material to pass through the sieve while guiding and propelling a flow of larger elements of the crop material past an edge of the sieve. A crop material distributor is disposed between the threshing system and the sieve, configured and operable for distributing the crop material from the threshing system onto the sieve. A sensor is configured and operable in response to sensing information representative of at least one of a quantity of grain associated with the crop material distributor and an inclination angle associated with the crop material distributor and outputting signals representative thereof. A controller in connection with the sensor is operable for receiving signals outputted thereby. The controller outputs signals to the crop material distributor and the sieve for operable control of operating parameters associated with the crop material distributor and the sieve in response to receiving signals representative of at least one of a quantity of grain associated with the crop material distributor and an inclination angle associated with at least one of the crop material distributor and the combine.

The present invention further relates to a method for distributing crop material onto a cleaning sieve of an agricultural combine. The method further includes providing a sensor in connection with a controller. The sensor senses information representative of at least one of a quantity of grain associated with a crop material distributor and an inclination angle associated with the crop material distributor. The method further includes outputting signals representative of at least one of a quantity of grain associated with a crop material distributor and an inclination angle associated with the crop material distributor to the controller. The method further includes providing the crop material distributor disposed between a threshing system of the combine and the sieve, for distributing crop material from the threshing system generally evenly onto the sieve. The method further includes the controller determining information representative of at least one of a quantity of grain associated with a crop material distributor and an inclination angle associated with at least one of the crop material distributor and the combine. The method further includes outputting signals for operable control of operating parameters associated with the crop material distributor and the sieve.

Grain loss sensors are operable in the conventional, well-known manner, for instance, by sensing electrical capacitance change, for measuring or quantifying the amount of grain loss past the edge of the cleaning sieve, and can be disposed, for instance, adjacent opposite ends of the edge of the sieve, and at one or more intermediate locations therealong, for determining grain losses at those locations, which information can be used for determining a distribution of grain losses across the edge or extent of the sieve. Grain loss sensors can be used alone, or with one or more other sensors, for instance, a load sensor, mass sensor, optical sensor, or the like, for determining crop material distribution on or to the cleaning sieve, and/or on or a crop material distributor disposed intermediate the threshing and cleaning systems, such as, a grain pan, sieve, preparation floor, or the like.

Numerous other features and advantages of the present invention will become readily apparent from the following detailed description, the accompanying drawings, and the appended claims.

Numerous other features and advantages of the present invention will become readily apparent from the following detailed description, the accompanying drawings, and the appended claims.

DETAILED DESCRIPTION OF THE INVENTION

Figure 1:
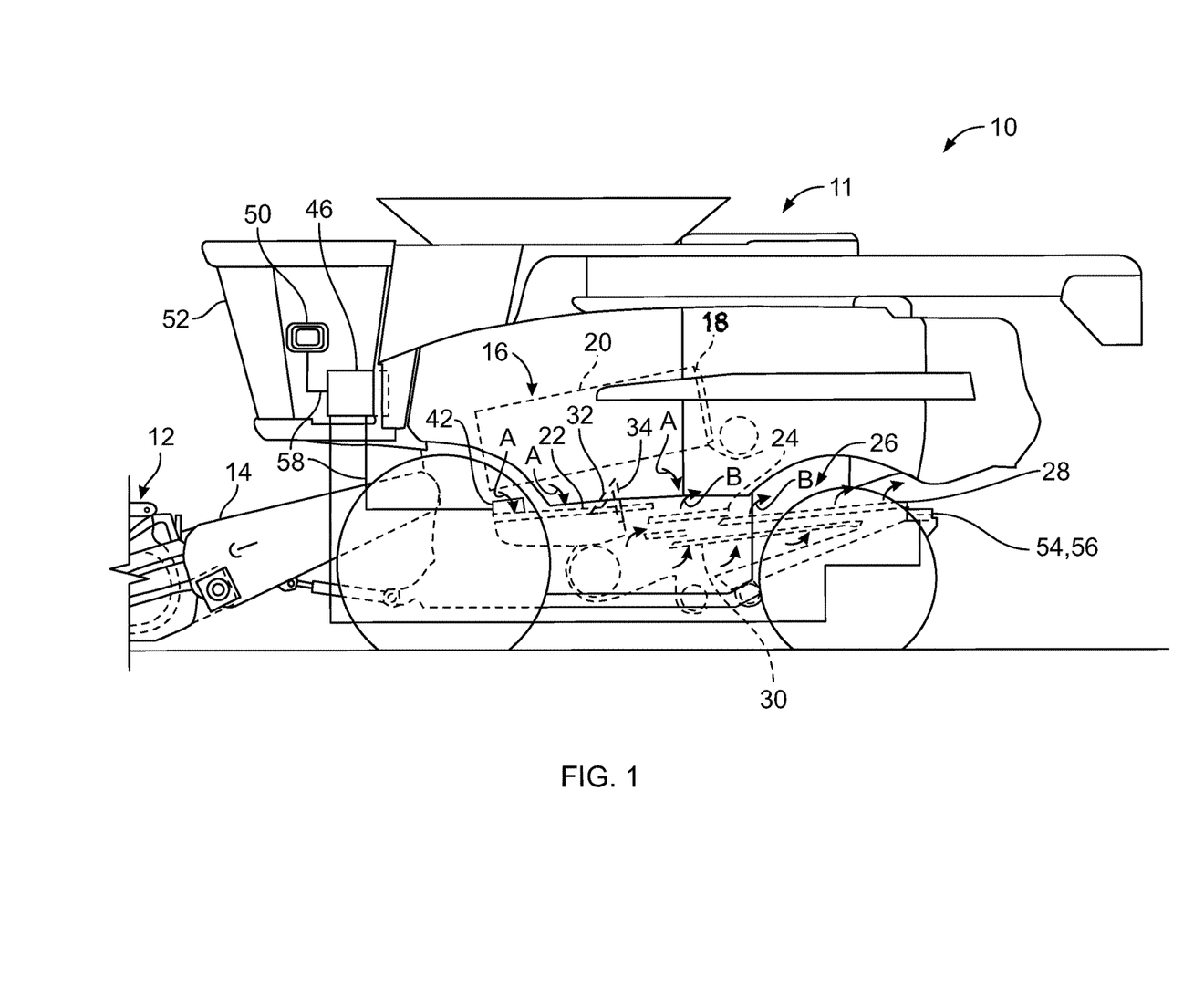
FIG. 1 is a side view of an agricultural combine, including a system for controllably delivering crop material to a distribution system of the combine, according to the present invention.

Referring now to the drawings, wherein preferred embodiments of the present invention are shown, in FIG. 1, a typical self-propelled harvester or agricultural combine 10 is shown having a delivery control system 11, including a header 12 mounted on a front end thereof, and operable for severing crops from a field during forward motion of combine 10. Combine 10 includes a feeder 14 operable for conveying the cut crops to a rotary threshing system 16 within combine 10. Threshing system 16 generally includes one or more rotors 18 rotatable within a corresponding number of perforated concaves 20, for threshing and separating smaller elements of crop material including grain from larger elements such as stalks, leaves and the like. Flows of the smaller elements of the crop material are discharged through the perforations of concave 20, as denoted generally by arrows A. Generally, the flows of crop material denoted by arrows A will be uneven, so as to be more concentrated or heavier in some regions, and lighter in other regions, which unevenness will be the result of one or more of a variety of factors, as discussed above.

The flows of crop material, denoted by arrows A, will fall mostly onto a crop material distributor 22 disposed beneath threshing system 16, which distributor 22 can comprise a conventionally constructed grain pan operable for conveying crop material rearwardly thereover to a rear edge thereof, over which the crop material will be propelled so as to fall as a mat onto an upper cleaning sieve 24 of a cleaning system 26 of combine 10. Alternatively, distributor 22 can comprise a sieve. As the crop material mat drops onto upper cleaning sieve 24, that sieve will be vibrated while a flow of air is directed upwardly and rearwardly therethrough, as denoted by arrows B, such that larger, lighter elements of the crop material other than grain will be directed over or past a rear edge 28 of sieve 24, for disposal, in the well-known manner. Smaller, heavier elements of the crop material, including grain, will be allowed to pass downwardly through sieve 24 to a lower sieve 30, for further cleaning, again, in the well known manner.

Figure 2:
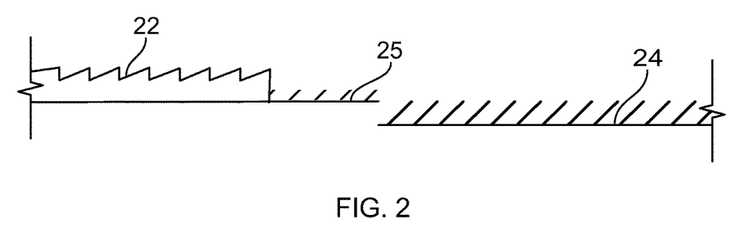
FIGS. 2-5 are partial side views of different embodiments of distribution systems according to the present invention.
Figure 4:
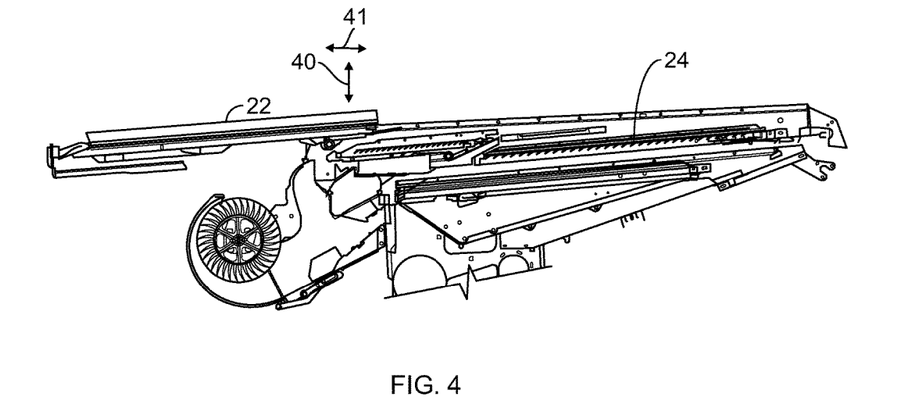

As shown in FIGS. 2 and 4, crop material distributor 22 includes a pre-sieve or shortened sieve 25 (FIG. 2) connected thereto, after which crop material (not shown) passing over sieve 25 is deposited onto sieve 24. Seed would be separated from MOG as the crop material moves rearward (i.e., from distributor 22 toward sieve 24). In one embodiment, and for purposes of this disclosure, sieve 24 and cleaning system 26, which includes sieve 24, may be used interchangeably. As further shown in FIG. 5, at least one of crop material distributor 22 and/or sieve 24 may be urged into independent reciprocating movement to help more evenly regulate or control crop movement. That is, in an effort to reduce a "surge" of crop material, such as associated with the harvester encountering uphill terrain of sufficient magnitude to urge an amount of crop material too large for the cleaning system of the combine to properly handle, the crop material moving along distributor 22 toward sieve 24, a controller 46 (FIG. 1) controls operation of crop material distributor 22 and sieve 24. In another embodiment, control of operating parameters associated with crop material distributor 22 and sieve 25 may be achieved independent of each other, i.e., the cleaning speed of the cleaning system of the combine may be independent of the speed of the crop material distributor.

Figure 6:
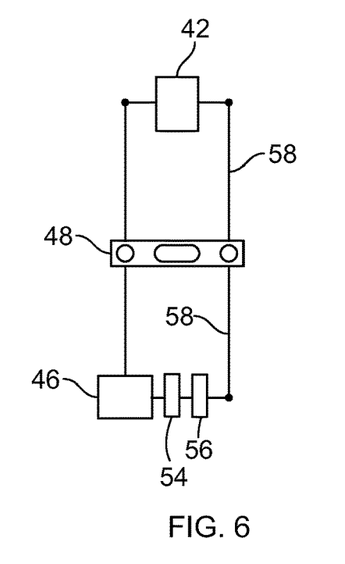
FIG. 6 is a schematic representation of an embodiment of a distribution system according to the present invention.

For example, as shown in FIGS. 4 and 6, controller 46, in response to receiving a signal from a sensor 48, provides operable control of operating parameters associated with crop material distributor 22 and sieve 24. In one example, such operating parameters may include an inclinometer generated in response to sensing an inclination angle of sufficient magnitude of at least one of the crop material distributor and/or the combine, and/or sensing information representative of a quantity of grain, urging crop material distributor 22 and/or sieve 24 into reciprocating movement in one or more of a first direction 40 and a second direction 41. Sensed information representative of a quantity of grain can include a weight of crop material positioned on crop material distributor 22, a depth of crop material positioned on crop material distributor 22 or a measurement of structural loading on system drive components associated with movement of the crop material within the combine cleaning system (e.g., torque or other measurement of force associated with shafts, bearings, linkages or other cleaning system components). In one embodiment, reciprocating movement in first direction 40 is perpendicular to reciprocating movement in second direction 41. In a further embodiment, operable control of system 11 of crop material distributor 22 is independent of the system's operable control of sieve 24. However, in another embodiment, operable control of system 11 of crop material distributor 22 is proportionally related to the system's operable control of sieve 24. Alternately, in response to the inclinometer or sensor 48 generating a signal upon sensing a sufficient reduction in the inclination angle of at least one of the crop material distributor and/or the combine, operable control of crop material distributor 22 and sieve 24 may be applied in the opposite direction or reduced magnitude, as appropriate. It is to be understood that the timing and extent (length of reciprocating stroke movements 40, 41) and even speed of such reciprocating movements may be affected by the previous magnitude, as well as duration of the "uphill" inclination angle, the type of crop material, as well as other factors.

It is to be understood that the operable control of system 11 can be overridden by manual operator input.

Figure 3:
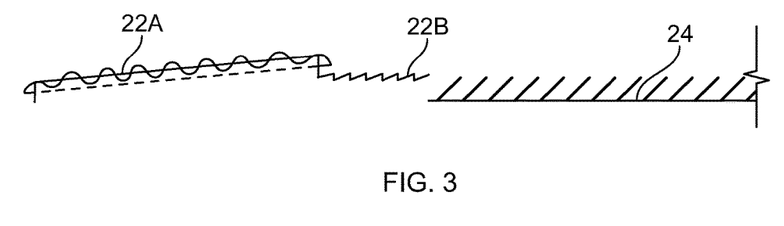

As shown in FIG. 3, another embodiment of crop material distributor 22 includes an auger or auger distributor or auger bed 22A extending to a shortened grain pan 25. For purposes herein, crop material distributor 22 and crop material distributor 22A may be used interchangeably. Grain pan 25 provides a small improvement with respect to grain loss or "dumping" as the crop material moves rearward, such as from uphill travel of the harvester (not shown).

For example, as shown in FIGS. 3 and 6, controller 46, in response to receiving a signal from a sensor 48, provides operable control of operating parameters associated with crop material distributor 22A and sieve 24. In one example, such operating parameters may include an inclinometer generated in response to sensing an inclination angle of sufficient magnitude of at least one of the crop material distributor and/or the combine, and/or sensing information representative of a quantity of grain, urging crop material distributor 22A into controlled rotational movement (i.e., faster or slower rate of rotation or even reversed direction of rotation in addition to controlled speed of rotation) and/or sieve 24 into reciprocating movement in one or more of a first direction 40 and a second direction 41. In yet another embodiment, instead of an auger 22A, a belt conveyor, raddle chain or other suitable form of crop material distributor, subject to similar controlled movement to control the quantity of grain moved thereover may be used. Sensed information representative of a quantity of grain can include a weight of crop material positioned on crop material distributor 22A, a depth of crop material positioned on crop material distributor 22A or a measurement of structural loading on system drive components associated with movement of the crop material within the combine cleaning system (e.g., torque or other measurement of force associated with shafts, bearings, linkages or other cleaning system components). In one embodiment, reciprocating movement in first direction 40 is perpendicular to reciprocating movement in second direction 41. In a further embodiment, operable control of system 11 of crop material distributor 22A is independent of the system's operable control of sieve 24. However, in another embodiment, operable control of system 11 of crop material distributor 22A is proportionally related to the system's operable control of sieve 24. Alternately, in response to the inclinometer or sensor 48 generating a signal upon sensing a sufficient reduction in the inclination angle of at least one of the crop material distributor and/or the combine, operable control of crop material distributor 22A and sieve 24 may be applied in the opposite direction or reduced magnitude, respectively, as appropriate. It is to be understood that the timing and extent (length of reciprocating stroke movements 40, 41), and even speed of such rotational movement may be affected by the previous magnitude, as well as duration of the "uphill" inclination angle, the type of crop material, as well as other factors.

Figure 5:
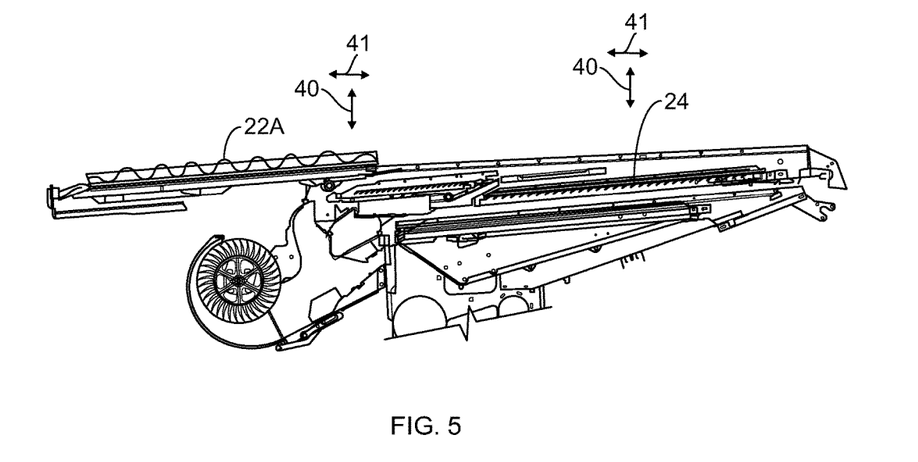

In exemplary embodiments of harvester or combine 10 as shown in FIGS. 1, 4, 5, operative control of crop material distributor 22 and sieve 24 is achieved by operative connection to a single controller 46, which preferably comprises a conventional programmable processor based controller commonly utilized for controlling various combine operations and functions in the well-known manner. In this regard, controller 46 can operably control operating parameters of crop material distributor 22 and sieve 24 for controlling grain distribution to sieve 24, for reasons such as controlling grain loss. Thus, system 11 comprises controller 46, but it should be recognized that controller 46 can perform a variety of other functions, including, but not limited to, cleaning system leveling. System 11 additionally is illustrated as comprising an optional input device 50, which can be for instance, an interactive device such as a touch screen or the like, or a switch, connected to controller 46 and located within an operator cab 52 of combine 10, usable for inputting positional and other commands to system 11, and optionally for viewing system information. System 11 preferably also comprises at least one sensor operable for sensing or detecting a condition indicative of performance thereof, and/or the effects of performance thereof, to facilitate monitoring and controlling operation thereof, which, in this embodiment of the system, includes at least two grain loss detectors 54 and 56 disposed adjacent opposite ends of, or at spaced apart locations along, rear edge 28 of sieve 24.

As shown in FIGS. 1 and 6, controller 46 may be connected to input device 50 and to grain loss detectors 54 and 56, as well as sensors 42 and 48, via suitable conductive paths 58, which can include, for instance, but are not limited to, wires of a wiring harness, and/or one or more communications networks, such as a controller area network.

Controller 46 is automatically operable for controlling movement of crop material distributor 32 as a function of system 11, and at least sieve 24 of cleaning system 26 (sieves 24 and 30 being jointly or separately controllable, as desired for a particular application) as a function of the distribution system. Here, as explained above, under at least some circumstances, threshing system 16 will discharge crop material at higher rates, or in heavier concentrations, from some regions of concave 20 compared to others. This can occur for a variety of reasons, such as, but not limited to, crop type, population, and moisture content, and can vary at least somewhat over the course of a harvesting episode. This can also occur, at least in part, as a result of combine settings, such as, but not limited to, a speed of operation of rotor 18, and a gap between rotor 18 and concave 20. This is undesirable, as also explained above, as it can affect the performance of cleaning system 26, particularly the amount of grain loss, as heavy build ups of crop material, particularly on upper sieve 24, can result in increased grain loss over or past rear edge 28. A problem identified above in this regard is that crop material build ups and concentrations on distributor 22 will typically be conveyed onto upper sieve 24. Sideward tilting of the combine can also result in increased crop material concentrations and build ups, with Applicant's U.S. Pat. No. 7,771,260, as previously mentioned, configured to address such sideward tilting, such as associated with the combine laterally traversing a slope of a hill.

Figure 7:
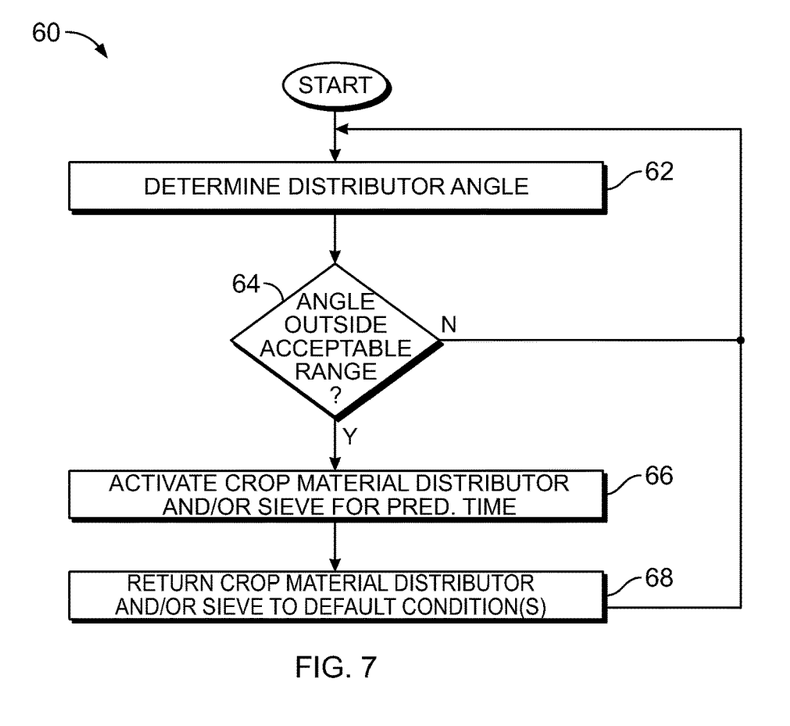
FIG. 7 is a flow diagram of an embodiment of a distribution system according to the present invention.

FIG. 7 is a high level flow diagram 60 illustrating steps of one possible method of operation of system 11 for providing operable control of operating parameters associated with the crop material distributor and sieve. According to the method, at block 62, a distributor inclination angle will be determined. This can be via an automatic process as controlled by controller 46, responsive to a desired parameter, such as grain loss, and the above-described manner (inclinometer or sensor 48). Alternatively, this could be responsive to a manually inputted command, via input device 50. Controller 46 would then either automatically control the crop material distributor and sieve for controlling a control parameter, e.g., grain quantity associated with the crop material distributor, or for other parameters, such as grain loss. As part of its cleaning system crop distribution function, at block 64 the inclination angle is determined whether it is outside of an acceptable range, such as, for example, within 5 degrees from a horizontal plane. If the inclination angle is not determined to be outside of an acceptable range, control of the method is returned to block 62 to again determine the inclination angle of the crop material distributor. However, if the inclination angle is determined to be outside of an acceptable range, method proceeds to block 66 which actuates crop material distributor 22 and/or sieve 24 for a predetermined period of time. In one embodiment the predetermined period of time is a fixed period of time, such as 5 seconds, or in another embodiment the predetermined time may depend upon the magnitude of the inclination angle, i.e., the magnitude of the amount inclination angle is outside of the acceptable range. Stated another way, the greater the magnitude of the inclination angle, the greater the extent of movement of crop material by movement of crop material distributor 22 and/or sieve 24. Upon completion of block 66, at block 68 the controller returns crop material distributor 22 and/or sieve 24 to its default condition(s), with control of the method returning to block 62 to repeat the method. In another embodiment, signals from other sensors 42 (FIGS. 1, 6), such as sensors associated with quantity of grain measurement, including a weight of crop material positioned on the crop material distributor or depth crop material positioned on the crop material distributor may also be utilized to control crop material distributor 22 and/or sieve 24. Additionally sensors associated with measurement of structural loading on system drive components may be utilized. That is, if grain sensors indicated that excessive grain loss were still occurring, control crop material distributor 22 and/or sieve 24 would not yet be returned to the default position. Controller 46 can be programmed to automatically adjust for such sensor readings, on an ongoing basis, in real-time, or near real-time, to maintain the control parameter, or the commanded operating condition(s) of control crop material distributor 22 and/or sieve 24 in relation to a fixed reference, such as horizontal, so as to maintain system performance.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for distributing crop material, severed from a field on a cleaning sieve of an agricultural combine, during its forward motion, comprising:
    a threshing system;
    a sieve positioned and configured for receiving crop material containing grain from the threshing system and allowing the grain and smaller elements of the crop material to pass through the sieve while guiding and propelling a flow of larger elements of the crop material past an edge of the sieve;
    a crop material distributor disposed between the threshing system and the sieve, configured and operable for distributing the crop material from the threshing system rearwardly onto the sieve;
    a sensor configured and operable in response to sensing information representative of a quantity of grain associated with the crop material distributor and a forward-rearward inclination angle associated with the crop material distributor relative to the forward motion of said agricultural combine and outputting signals representative thereof; and,
    a controller in connection with the sensor operable for receiving signals outputted thereby, the controller outputting signals to the crop material distributor and the sieve for independent operable control of operating parameters associated with the crop material distributor and the sieve in response to receiving signals representative of a quantity of grain associated with the crop material distributor and said forward-rearward inclination angle associated with the crop material distributor, wherein the controller is configured to adjust the operating parameters of the crop material distributor to control crop material flow from the crop material distributor to the sieve wherein operable control of operating parameters associated with the crop material distributor and the sieve consists of at least one of controlling rotational speed of at least one of an auger, a conveyor belt, and a raddle chain that form a portion of the crop material distributor in response to the signals from the sensor, and a variance of reciprocating movement speed of at least one of the crop material distributor and the sieve, and a variance of a reciprocating movement of at least one of the crop material distributor and the sieve in a first direction, a variance of a reciprocating movement of at least one of the crop material distributor and the sieve in a second direction, and a combination thereof.

2. The system of claim 1, wherein selective manual operation by an operator overrides operable control of the crop material distributor and the sieve by the controller.

3. The system of claim 1, wherein the system's operable control of the crop material distributor is proportionally related to the system's operable control of the sieve.

4. The system of claim 1, wherein sensing information representative of a quantity of grain includes a depth of crop material positioned on the crop material distributor.

5. The system of claim 1, wherein sensing information representative of a quantity of grain includes a weight of crop material positioned on the crop material distributor.

6. The system of claim 1, wherein sensing information representative of a quantity of grain includes a measurement of structural loading on a system drive component.

7. The system of claim 1, wherein the crop material distributor is selected from the group consisting of an auger, a conveyor belt, a raddle chain, a grain pan and a combination thereof.

8. A method for distributing crop material, severed from a field, rearward onto a cleaning sieve of an agricultural combine, during its forward motion, comprising:
    providing a crop material distributor disposed between a threshing system of the combine and the sieve, for distributing crop material from the threshing system generally evenly onto the sieve;
    providing a sensor in connection with a controller,
        the sensor:
            sensing information representative of a quantity of grain associated with the crop material distributor and a forward-rearward inclination angle associated with the crop material distributor relative to the forward motion of said agricultural combine;
            outputting signals representative of a quantity of grain associated with a crop material distributor and said forward-rearward inclination angle associated with the crop material distributor to the controller; and
        the controller:
            determining information representative of a quantity of grain associated with a crop material distributor and said forward-rearward inclination angle associated with the crop material distributor; and
            outputting signals for independent operable control of operating parameters associated with the crop material distributor and the sieve;
            wherein the controller adjusts the operating parameters of the crop material distributor to regulate the crop flow from the crop material distributor to the sieve in response to at least one of variations in the quantity of grain on the distributor and variations in said forward-rearward inclination angle of the combine, wherein operable control of operating parameters associated with the crop material distributor and the sieve consists of at least one of controlling rotational speed of at least one of an auger, a conveyor belt, and a raddle chain and a variance of reciprocating movement speed of at least one of the crop material distributor and the sieve, and a variance of a reciprocating movement of at least one of the crop material distributor and the sieve in a first direction, a variance of a reciprocating movement of at least one of the crop material distributor and the sieve in a second direction, and a combination thereof.

9. The method of claim 8, wherein selective manual operation by an operator overrides operable control of operating parameters associated with the crop material distributor and the sieve.

10. The method of claim 8, wherein the system's operable control of the crop material distributor is proportionally related to the system's operable control of the sieve.

11. The method of claim 8, wherein sensing information representative of a quantity of grain includes a depth of crop material position de on the crop material distributor.

12. The method of claim 8, wherein sensing information representative of a quantity of grain includes a weight of crop material positioned on the crop material distributor.

13. The method of claim 8, wherein sensing information representative of a quantity of grain includes a measurement of structural loading on a system drive component.

14. The method of claim 8, wherein the crop material distributor is selected from the group consisting of an auger, a conveyor belt, a raddle chain, a grain pan and a combination thereof.

\* \* \* \* \*